United States Patent [19]

Croft

[11] Patent Number: 5,541,853
[45] Date of Patent: Jul. 30, 1996

[54] PROCESSOR CONFIGURABLE FOR BOTH VIRTUAL MODE AND PROTECTED MODE

[75] Inventor: Stephen J. Croft, Berks, United Kingdom

[73] Assignee: Madge Networks Limited, Buckinghamshire, United Kingdom

[21] Appl. No.: 257,049

[22] Filed: Jun. 8, 1994

[30] Foreign Application Priority Data

Jun. 9, 1993 [GB] United Kingdom .................. 9311935

[51] Int. Cl.⁶ ................................................. G06F 15/163
[52] U.S. Cl. ...................................... 364/514 R; 395/700
[58] Field of Search .............................. 364/514, 514 R; 395/700, 903, 909

[56] References Cited

U.S. PATENT DOCUMENTS

| 5,086,402 | 2/1992 | Sterling, II | 364/514 |
| 5,095,445 | 3/1992 | Sekiguchi | 364/514 |
| 5,303,378 | 4/1994 | Cohen | 395/700 |

FOREIGN PATENT DOCUMENTS 0210640  4/1987  European Pat. Off. .

OTHER PUBLICATIONS

IBM Corp., "OS/2 Version 2.0 vol. 2: DOS and Windows Environment," Apr. 1992, Chapter 3, pp. 29–35.

*Primary Examiner*—Emanuel T. Voeltz
*Assistant Examiner*—Thomas Peeso
*Attorney, Agent, or Firm*—Sughrue, Mion, Zinn, Macpeak & Seas

[57] ABSTRACT

A processor system for connection to a communications network comprises a processor and a memory configurable for operation with the processor in at least two modes, a virtual mode and a protected mode in which operation of the processor and memory is dedicated to data transfer between the processor system and a communications network. A switching device is provided for switching between the virtual and protected modes, which is operable under user program control, in response to a data transfer request generated when data is to be transferred between the memory and the communications network. The switching device then switches to the protected mode, such that there is direct data transfer between the memory and the communications network. A method of controlling transfer of data between a communications network and the processor system, comprises configuring a memory in the processor system for operation with a processor in at least a virtual and a protected mode in which operation of the processor and memory is dedicated to data transfer between the processor system and a communications network. Switching between virtual and protected modes occurs under user program control, in response to a data transfer request, when data is to be transferred between the memory and the communications network.

4 Claims, 3 Drawing Sheets

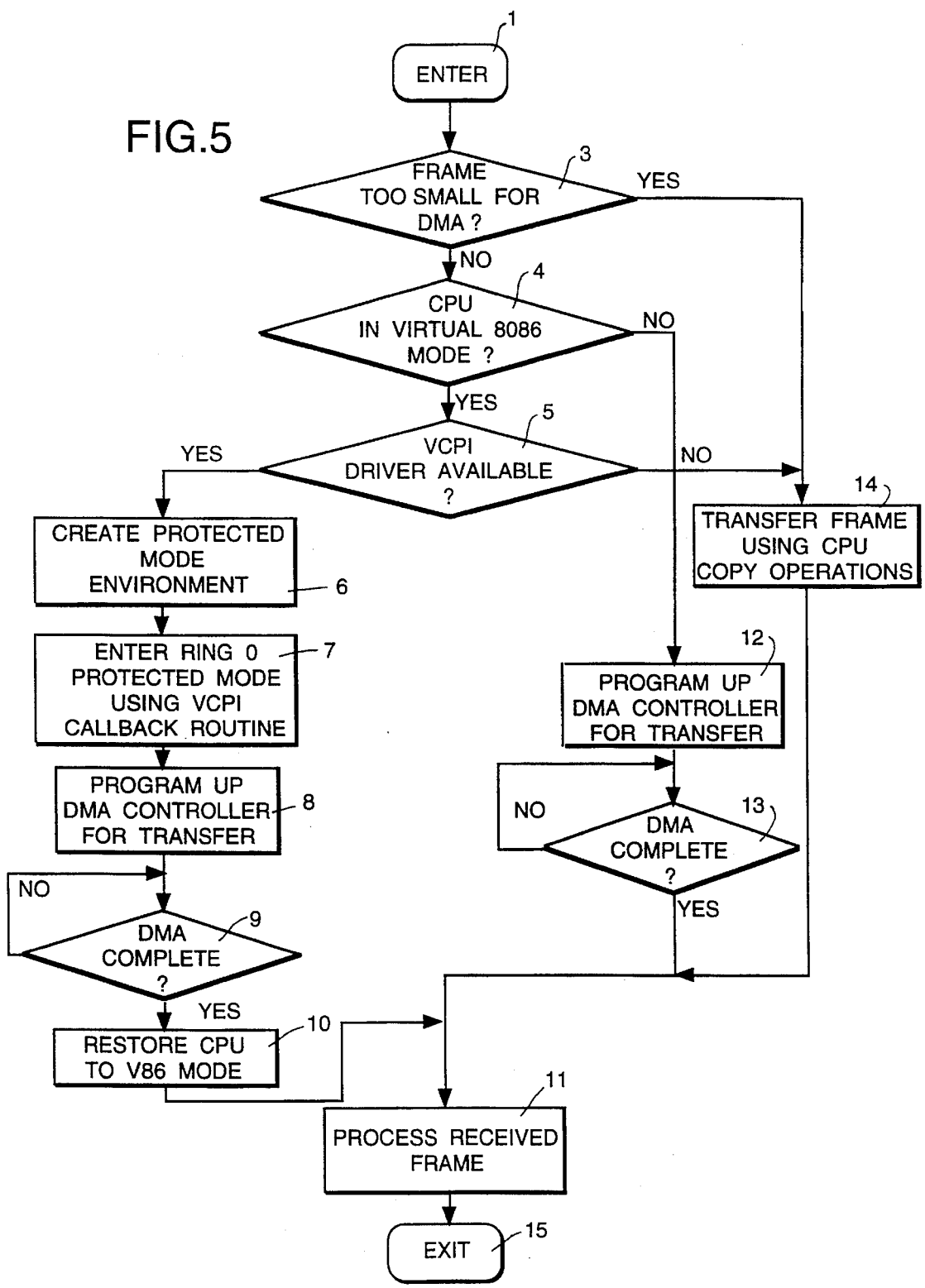

PROCESSOR CONFIGURABLE FOR BOTH VIRTUAL MODE AND PROTECTED MODE

FIELD OF THE INVENTION

This invention relates to a processor for connection to a communications network.

DESCRIPTION OF THE PRIOR ART

In a conventional processor, it is desirable to be able to carry out multi-tasking operation, for example to be able to run programs which have a large memory requirement, such as running a spread sheet or word processing program, on a PC. One way of achieving this is by adapting the processor's memory space to be split up into a number of areas, each area mimicking a complete PC. This is known as virtual mode operation. Each area is then called a virtual machine. Within each virtual machine an operating programme and any other required software is stored. Each virtual machine requires its own hardware such as display, direct memory access controller (DMAC), serial ports etc, but since the available hardware is limited to the single installation in each PC the virtual machines must share the hardware. To allow this, a memory manager is provided which traps attempted accesses to hardware by the programmes running on the virtual machines, stores them and when the corresponding hardware is free on the PC then controls the access of the stored data to the hardware. This assures that only one programme at any time in one virtual machine has control of a piece of real hardware. The memory addresses which the virtual machines use do not correspond to the true memory address as seen by the real hardware and therefore memory address conversion is required before the real hardware can be programmed. The memory manager may also provide protection against programmes running on different virtual machines corrupting each other.

Virtual mode operation is available on current extensions to MS-DOS allowing users to take advantage of the virtual 8086 mode implemented within the Intel 386 and later processors. This allows users to simultaneously run many programs under DOS and to dynamically re-configure the memory within the PC. Examples of such programs are: QEMM, 386MAX, and Windows 3.1 Enhanced Mode. The virtual 8086 mode allows the CPU's memory space to be split up into a number of separate areas or virtual machines, each mimicking a complete PC. Within each virtual machine a DOS program can be loaded and run. Each virtual machine has a complete private copy of DOS and any other software loaded when the machine was started.

While these programs increase the flexibility of the PC from the user's perspective, they place significant controls over the operation of software running on the PC, and can significantly slow the operation of any network interface card (NIC) driver software.

The performance of a machine using a processor which has a memory manager to control access to hardware is typically slowed by up to 30% when operating in this way when compared to operating in a direct (non-virtual) mode. This delay is acceptable for slow devices such as floppy disk printers and serial ports, but is not acceptable for data transfer within communication networks. The delay is generally a result of carrying out required checks and/or copying data through intermediate buffers before it is read from or written to the network. An attempt to program the DMAC to transfer data from the network whilst a virtual program is running will result in writing the program data into memory space first and the memory manager then transferring the program data to the real DMAC. This introduces delay.

SUMMARY OF THE INVENTION

In accordance with one aspect of the present invention, a processor system for connection to a communications network comprises a processor and a memory configurable for operation with the processor in at least a virtual mode and a protected mode in which operation of the processor and memory is dedicated to data transfer between the processor system and a communications network; and switching means for switching between the virtual and protected modes, wherein the switching means are operable under user program control, in response to a data transfer request generated when data is to be transferred between the memory and the communications network, to switch to the protected mode, such that there is direct data transfer between the memory and the communications network.

The processor of the present invention overcomes the disadvantage when operating in a virtual mode of slow speed of communication with the communications network, by causing the processor to switch under user program control from the virtual mode to a protected mode, where all hardware is directly accessible to the network card driver software, when a data transfer request is received. When data transfer has been completed the switching means switches back to virtual mode to allow processing to continue in the virtual machine which was operating before the data transfer request.

This is achieved without requiring the communications network interface to have its own DMAC which would add to the cost and could be difficult to install where space is at a premium. The user's program controls the operation of the switching means for switching between virtual and protected mode. In a conventional system leaving virtual mode and entering protected mode is controlled by the operating system and is inaccessible to the user's program.

In accordance with a second aspect of the present invention, a method of controlling transfer of data between a communications network and a processor system comprises configuring a memory in the processor system for operation with a processor in at least a virtual and a protected mode in which operation of the processor and memory is dedicated to data transfer between the processor system and a communications network; and operating switching means under user program control, in response to a data transfer request, when data is to be transferred between the memory and the communications network, to switch between the virtual and protected modes such that there is direct data transfer between the memory and the communications network.

The invention can be implemented using certain known processors in the following way. Within each memory manager there exist a number of mechanisms provided to allow very large programs to be run that require all the resources of the PC (using tools called DOS extenders) or to allow a number of memory managers to run together (e.g. QEMM loaded with Windows 3.1). These mechanisms correspond to a number of industry standards, an example being VCPI (Virtual Control Programming Interface). A facility provided on the Intel 386 and later chips, called ring O, is a high privilege level common only to the operating system by which a trusted program takes complete control of the PC and all the hardware associated with the PC. In the present invention direct control of the DMA and NIC hardware is made possible, without the overhead of the memory manager checking and trapping each attempted hardware access, by making use of VCPI in a manner quite different from that intended.

BRIEF DESCRIPTION OF THE DRAWINGS

An example of a processor system according to the present invention will now be described with reference to the accompanying drawings, in which.

EMBODIMENT

In a conventional communications network, end stations such as PCs are able to transmit data over a network under the control of a protocol such as token ring, FDDI etc. Each end station is connected to the network by an adaptor card or network interface card (NIC). Processing of data takes place within each end station independently. If data on the network is addressed to a particular end station then any processing taking place at that end station must be interrupted before the data on the network can be transferred from the Network Interface Card. In conjunction with the network interface card there will be an associated software driver module that is responsible for initialising the NIC, and transferring frames between the memory within the end station and the network interface card. This could be under the control of the end station CPU. An example of the invention will be described with particular reference to the Intel 80386 processor.

Figure 1:
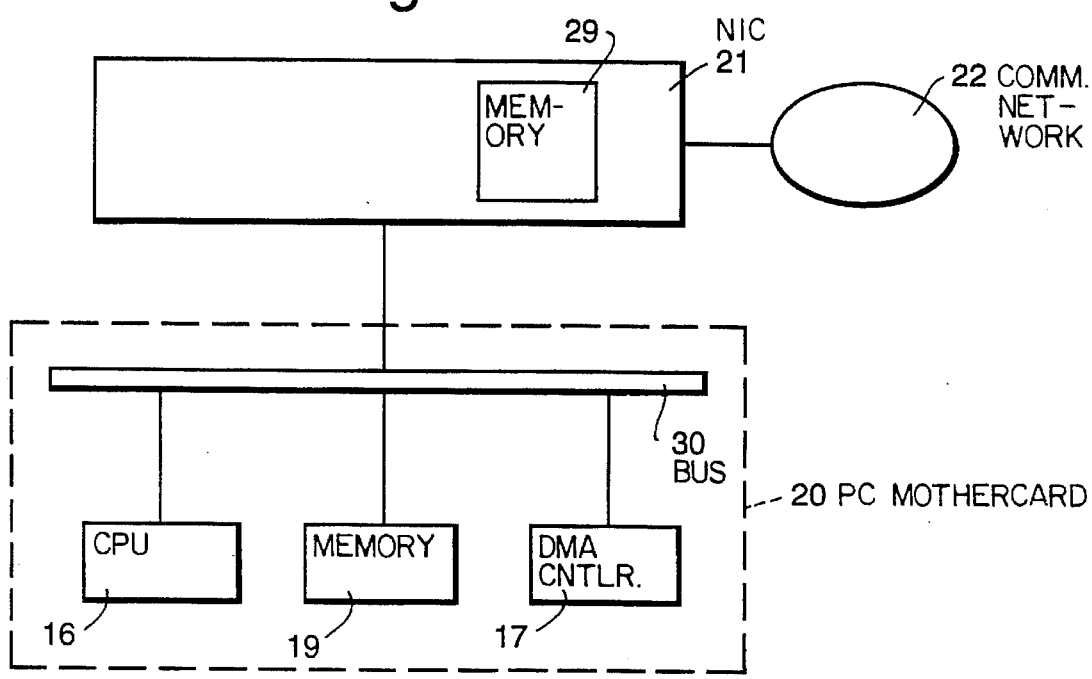
FIG. 1 shows a processor system and interface for connection to a communications network.

FIG. 1 shows a PC Mothercard 20 in an end station. The Mothercard 20 comprises a CPU 16, a DMA controller 17 and a memory 19. The Mothercard 20 incorporates a PC bus 30 to connect the CPU, memory and DMAC to a communications network 22 via a network interface card (NIC) 21. The NIC may be for example an FDDI adapter card. A private memory 29 on the NIC 21 is connected to the DMAC 17.

Figure 2:
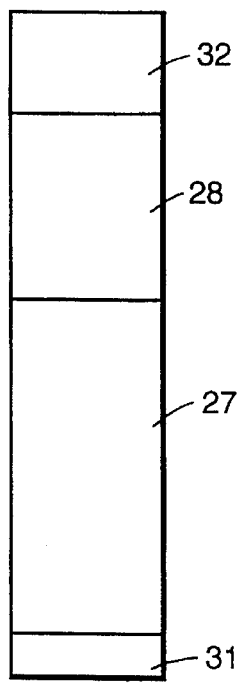
FIG. 2 illustrates the arrangement of memory space in a processor system for real mode operation.

FIG. 2 shows the arrangement of memory space in the memory 19 for operation in real mode. Area 28 represents hardware control software stored in ROM whilst operating system software is in area 31 and the program in use is represented by area 27. Only 1 MByte of RAM can be accessed. The space available for programming can be expanded by additional RAM above area 28. Area 32 shows additional memory, between 1 MByte and 16 MByte, that can be accessed in protected mode.

Figure 3:
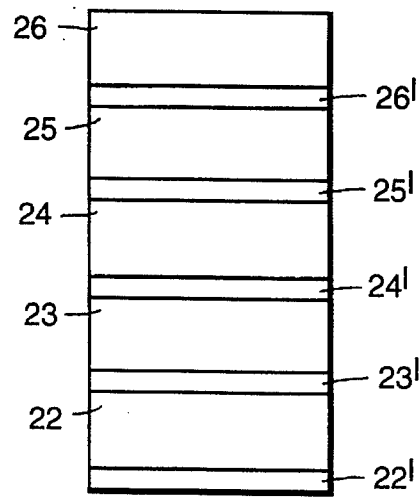
FIG. 3 illustrates the arrangement of memory space in the processor system for virtual mode operation.

Operating the processor memory 19 in virtual mode enables multitasking to take place without needing to alter the operating system. FIG. 3 illustrates the arrangement of the memory space in virtual mode. Each virtual machine 22–26 runs a different program and is provided with its own copy of the operating system software 22'–26'. Each virtual machine mimics a complete PC, but only virtual machine 22 is connected to real hardware. The remaining virtual machines 23–26 are only able to access hardware via the memory manager which traps their hardware access attempts and stores them until the hardware is available.

Figure 4:
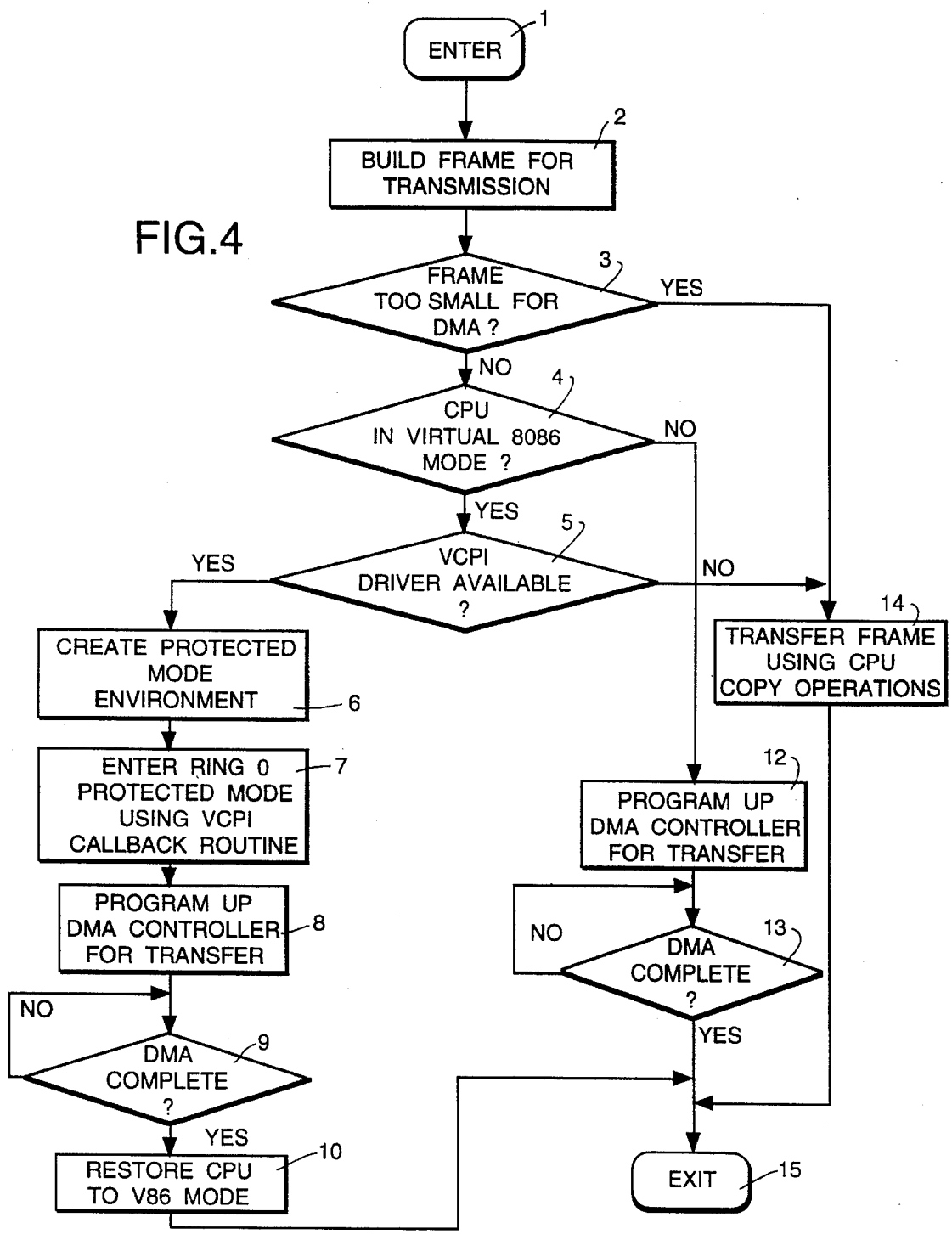
FIG. 4 is a flow chart showing the procedure required to transmit data from the processor system; and, FIG. 5 is a flow chart showing the procedure to transmit data to the processor system.

Operation of the apparatus of FIG. 1 is further explained with reference to the flow diagrams of FIGS. 4 and 5. In order to transmit from the end station on to the communications network 22 a frame to transmit is created in the memory 19 (step 2). This includes necessary routing operations for use when the frame has been transmitted onto the network 22. For frames smaller than approximately 100 bytes the most efficient mode of transfer is simply copying the data in the memory 19 into the private memory 29 on the network interface card 21 itself. The size of the frame is thus compared with a threshold value to see if it is too small to use direct memory access (DMA) efficiently (step 3). If the test is negative, then the processor is tested (step 4) for whether the CPU is operating in virtual mode (known as V86 mode). This is done by testing the protected mode bit of the machine status word. Since the software driver module is an 8086 driver, the processor must either be in real mode or virtual mode. If the processor is in real mode, there is no memory manager present and the DMAC can be accessed without any problems.

Where the processor is operating in virtual mode, a further test (step 5) is carried out to see whether a virtual control programming interface (VCPI) is provided, which is conventionally used to run very large programmes by taking over the whole of the memory space 22–26. Memory managers cannot in general be unloaded, so since this test is expensive in terms of time it is performed once at initialise time, and the result is remembered. The test involves calling the VCPI presence test interrupt according to the VCPI specification. If VCPI is not present and the processor is in virtual mode, then there must be a non-VCPI compliant memory manager and some form of CPU copying is done on the frame rather than DMA. If it is available then operation is switched to protected mode operation using the VCPI driver (step 6). The driver software sets up various protected mode structures. These include the Global Descriptor Table (GDT), Interrupt Descriptor Table (IDT), Task State Segment (TSS), and page tables. As an optimisation, most of these need only be set up once at initialise time. Only the stack GDT entry needs to be set up at this point, since the driver cannot predict which stack it will be using.

In the Intel 386 and later processors a highest level of operation known as Ring O is available in which the whole memory space 22–26,32 becomes available for protected mode operation. This level is entered under VCPI control using a call back routine (step 7). The driver uses the VCPI enter-protected-mode interrupt passing the structures previously prepared. VCPI performs a complete machine context switch on behalf of the driver, then calls the driver back at ring O. At this point the memory manager has lost control of the machine to the driver, and can no longer influence it. The user has full control of all operating system functions including programming (step 8) the DMA controller for transfer. Programming the DMAC can then take account of how the memory has been mapped by the memory manager. DMA is very fast, typically 33 to 40 MBytes per second and so does not unduly affect the processing time. The driver then waits for the DMA to complete or time out, by polling the DMA status register. Transfer of data occurs whilst in protected mode and the system does not exit the protected mode until the data transfer is complete (step 9), whereupon the virtual mode is restored (step 10). The driver restores the virtual environment and returns control to the memory manager by issuing a VCPI call according to the VCPI specification to enter V86 mode.

Where the CPU is not operating in virtual mode there is no need to change the mode of operation. The DMA controller is programmed for transfer (step 12) and the routine exited (step 15) when transfer of data is complete (step 13). If the frame which has been created is too small for DMA to be worthwhile (step 3) then the frame is transferred using copy operations (step 14) which copy from the memory 19 to the private memory 29.

Data transfer from the interface card 21 to the processor 20 involves similar steps, except that the frame is already constructed and must be processed after reception.

FIG. 5 illustrates the procedure for receiving data from the network interface card. When another end station (not shown) on the network 22 transmits data to the memory 19, an interrupt is generated by the NIC 21, on arrival of the data which is received by the CPU 16, to indicate that there is data to be transferred. On receipt of the interrupt indicating there is a frame to be received, the size of the frame is tested (step 3). If it is too small to use DMA then it is transferred to the memory 19 using CPU copy operations (step 14). If not, then the CPU is tested to see if it is operating in virtual mode (step 4) and whether a VCPI driver is available (step 5). If no VCPI driver is available the frame may be copied using CPU copy operations (step 14).

The NIC driver software creates all the data structures required in memory to fully control the processor (step 6) and enters Ring O protected mode using a VCPI call back routine (step 7). The DMA controller is then programmed for data transfer (step 8) and until the transfer is completed (step 9) the CPU remains in protected mode.

The CPU is restored to virtual mode operation (step 10) when the transfer is completed and the received frame of data can be processed (step 11).

If the CPU is not operating in virtual mode (step 4) the DMA controller is programmed directly (step 12) and the received frame is processed (step 11) when the transfer is complete (step 13).

Use of these techniques has been made in conjunction with FDDI adapter cards in conjunction with Novell's Netware and Microsoft's LAN Manager. However these same techniques are applicable to any high speed networking peripheral. In practice, there will be additional processing stages not shown in FIGS. 4 and 5 to handle other operating systems such as Microsoft's Windows.

I claim:

1. A processor system for connection to a communications network, the system comprising:

a processor and a memory configurable for operation with the processor in at least a virtual mode and a protected mode in which operation of the processor and memory is dedicated to data transfer between the processor system and the communications network;

a communications network interface connected to the processor for connection to the communications network, said interface being adapted to generate a signal which is supplied to the processor when data destined for the processing system is received from the communications network; and switching means for switching between the virtual and protected modes, wherein the switching means are operable under user program control, in response to a data transfer request generated by said processor when data is to be transferred from said memory to said communications network and in response to said signal from said interface when data is to be transferred from said communications network to said memory, to switch to the protected mode, such that there is direct data transfer between the memory and the communications network.

2. A communications system comprising a communications network connected to a processor according to claim 1.

3. A method of controlling transfer of data between a communications network and a processor system including a processor and a memory configurable in at least a virtual mode and a protected mode in which operation of the processor and memory is dedicated to data transfer between the processor system and a communications network; the method comprising:

a) determining when data is to be transferred between the processor system and a communication network and generating a data transfer request; and b) operating switching means under user program control, in response to said data transfer request, to switch to said protected mode such that there is direct data transfer between the memory and the communications network.

4. A method according to claim 3, further comprising comparing the data to be transferred with a threshold and, if the amount of data is less than the threshold, transferring the data using a copy operation and otherwise carrying out step b).

* * * * *